United States Patent [19]
Torkkel

[11] Patent Number: 5,903,602
[45] Date of Patent: May 11, 1999

[54] METHOD FOR CONTROLLING A MODEM CONNECTION IN THE EVENT OF DISTURBANCE

[75] Inventor: Jari Torkkel, Vantaa, Finland

[73] Assignee: Nokia Telecommunications Oy, Espoo, Finland

[21] Appl. No.: 08/602,831

[22] PCT Filed: Aug. 26, 1994

[86] PCT No.: PCT/FI94/00375

§ 371 Date: May 23, 1996

§ 102(e) Date: May 23, 1996

[87] PCT Pub. No.: WO95/06372

PCT Pub. Date: Mar. 2, 1995

[30] Foreign Application Priority Data

Aug. 27, 1993 [FI] Finland ................................ 933780

[51] Int. Cl.[6] .................................................... H04L 5/16
[52] U.S. Cl. ........................................ 375/222; 375/93.01
[58] Field of Search ..................................... 375/222, 219, 375/354, 357; 379/93.01

[56] References Cited

U.S. PATENT DOCUMENTS 4,613,979  9/1986  Kent ........................................ 375/357
5,202,905  4/1993  Sakamoto et al. ....................... 375/222
5,241,565  8/1993  Kloc et al. ............................... 375/222
5,317,594  5/1994  Goldstein ................................ 375/222

FOREIGN PATENT DOCUMENTS 0 409 641  1/1991  European Pat. Off. .
90/04297  4/1990  WIPO .

*Primary Examiner*—Tesfaldet Bocure
*Attorney, Agent, or Firm*—Pillsbury Madison & Sutro LLP

[57] ABSTRACT

A method for controlling a connection, especially a wireless connection, between two modems in the event of disturbance, which includes initiating a so-called retrain procedure in the event of disturbance when either one of the modems receives a signal of unsatisfactory quality. In the retrain procedure, the modems transmit predetermined retrain signals to each other in order to achieve synchronism between them. For reliable and rapid disconnection of a connection, the progress of the retrain procedure is monitored, and every time the procedure is stuck in a state other than a data transmission state for a period of time longer than a predetermined limit, the modem is commanded to initiate a repetition of the start-up procedure by means of which the connection between the modems was originally established.

4 Claims, 2 Drawing Sheets

METHOD FOR CONTROLLING A MODEM CONNECTION IN THE EVENT OF DISTURBANCE

This application claims benefit of international application PCT/FI94/00375 filed Aug. 26, 1994.

BACKGROUND OF THE INVENTION

The invention relates to a method for controlling a connection, especially a wireless connection, between two modems in the event of disturbance, this method comprising initiating a so-called retrain procedure in the event of disturbance when either one of the modems receives a signal of unsatisfactory quality, in which retrain procedure the modems transmit predetermined retrain signals to each other in order to achieve synchronism between them. The term wireless connection is used herein to refer to a connection implemented in such a manner that it is at least partly wireless.

A wireless radio network is originally intended for transmission of speech but it is also suitable for transmission of data. Data transmission in a radio network is carried out by means of a modem in a terminal and a mobile phone, e.g. a cellular phone. It is possible to use, for example, a modem positioned in a portable computer or a modem designed for a conventional telephone network. The modem is connected, for example, to a cellular phone by a separate adapter, which, for instance, adjusts the transmission level.

FIG. 1 of the attached drawings is a block diagram of equipment, known per se, for transmitting data between a computer 11 (typically a portable computer) or a terminal with a similar function and another terminal (not shown) connected to it through a radio network RN. The equipment comprises a modem 12, which is connected to the computer 11 and, via the above-mentioned adaptor 19, to a mobile phone 13. The modem 12 comprises an interface unit 14 (e.g. conventional RS-232 serial interface), to which the terminal 11 is connected, an error correction unit 16 connected to the interface unit, a data pump 17 connected to the error correction unit, a line interface unit 18 connected to the data pump 17, and a control processor 15 for controlling the operation of the modem. The actual modem part consists of the data pump 17, which modulates digital signals supplied from the terminal 11 to a form suitable for an analog telephone network and demodulates signals supplied from the telephone network to a form suitable for the terminal equipment. The data pump 17 is connected to the telephone network (adapter) through the analog line interface unit 18. The control processor 15 of the modem controls the data pump and performs error correction and all other functions of the modem, such as communication with the computer through the interface unit 14. The error correction unit 16 receives data transmitted through the interface unit, packs the data in frames of a fixed size, and transmits the frame through the data pump. At the reception end, the data pump 17 converts the received analog signal into digital form, whereafter the receiving error correction unit examines the received frame and detects any possible errors, which are corrected by means of retransmission.

In view of data transmission in a mobile telephone network, the most significant component of the modem is the data pump 17. The CCITT (at present the ITU-T) has defined a number of modulation standards of different rates for use in a general switched telephone network. These standards are illustrated in the following table.

| Recom-mendation | Rate (bit/s) | Modula-tion method | Carrier frequencies (Hz) | Symbol rate (1/s) |
|---|---|---|---|---|
| V.21 | 0–300 | FSK | 1080/1750 | 300 |
| V.23 | 1200/75 | FSK | 1700/420 | 1200/75 |
| V.22 | 600 1200 | QAM | 1200/2400 | 600 |
| V.22 bis | 1200 2400 | QAM | 1200/2400 | 600 |
| V.32 | 4800 9600 | QAM and TCM | 1800 | 2400 |
| V.32 bis | 4800 7200 9600 12000 14400 | QAM and TCM | 1800 | 2400 |

The abbreviations used in the third column of the table above have the following meanings: FSK=Frequency Shift Keying, QAM=Quadrature Amplitude Modulation, and TCM=Trellis Code Modulation.

As appears from the table, the modems according to recommendation V.32 bis offer a high rate and are thus a reasonable option even in radio networks. A V.32 bis connection is established between modems by a start-up procedure described on page 10 of recommendation V.32 bis. There are different procedures for the calling and the answering channel (modem). The establishment of the connection is described more closely in the above-mentioned recommendation, pages 14 to 16, which are referred to for a more detailed description. In practice, the start-up and the retrain procedure are almost identical, as the retrain procedure forms the synchronization part of the start-up procedure.

If the modems lose synchronism during the connection, the so-called retrain procedure, i.e. resynchronization of the modems, is carried out. The operating principle of the retrain procedure is illustrated in the figure on page 11 of the above-mentioned recommendation. A more detailed description of the retrain procedure is given on page 16 of the above-mentioned recommendation.

In a radio network there are often situations where modems lose synchronism, and the above-mentioned retrain procedure must be carried out. Such situations may occur in a wireless network, such as a cellular network, for the following reasons:

Synchronism is lost on account of change of base stations.

Noise is suddenly present on the connection, which prevents data from being transmitted at the current rate.

A cellular connection from a moving car brings about changes in the field, and radio waves reflected from buildings cause interference.

The quality of the line is low. (Operations in cellular networks are always performed within the area of a certain base station. The quality of the line is high near the base station but gets lower as the distance from the base station grows. In the area where base stations are changed the quality is usually low.)

The internal signalling (change of base stations, transmission level, field strength) carried out on a speech channel of a cellular network causes breaks in data transmission. Depending on the duration and frequency of the signalling, unnecessary resynchronizations, which weaken the performance, may take place on the data connection.

With a moving car, there are always shadow regions, in which the connection does not work in practice. The connection is, however, restored when the shadow region is left behind. A normal data connection is disconnected at such locations unless) special measures are taken to prevent it. A shadow region may also occur, for instance, at traffic lights, in which case the car may remain in the shadow region for rather a long time, even dozens of seconds.

The (wireless) network disconnects the connection.

In a normal telephone network the retrain procedure usually succeeds, and the modems return to the data transmission state. In a radio network, however, the quality of the connection varies, which causes problems. Modems designed for use in a normal telephone network usually disconnect the connection after two or three retrain attempts. In a mobile telephone network it is essential that the connection is not disconnected on account of disturbances in the network. In a normal case, the connection is disconnected by means of LINK DISCONNECT messages from a V.42 or an MNP error corrector or a GSTN CLEARDOWN sequence defined in recommendations V.32 and V.32 bis. If the (wireless) network disconnects the connection, the modems proceed to the retrain state and after a given time disconnect the connection as the retrain procedure does not succeed (the far end is no longer on the line). The given time must be extended even to several minutes so as to prevent unnecessary disconnection of the connection.

In a mobile telephone network, the change of base stations or the shadow regions due to the environment may thus lead to loss of synchronism between data pumps, wherefore the data pumps start the retrain procedure in order to be able to return to the data transmission state. Disturbances in the network may, however, lead to failure of the retrain procedure, in which case the procedure is started over again. When the quality of the connection is improved, the retrain procedure usually succeeds, and the modems return to the data transmission state. Very often, however, the retrain procedure does not succeed for some unaccountable reason no matter how high the quality of the mobile telephone connection is. In that event, there is no other alternative than to disconnect the connection and to establish it all over again.

As appears from the above, the problems caused in data transmission by wireless connections are such that the current methods do not provide a reliable and sufficiently rapid way to maintain or disconnect a connection.

SUMMARY OF THE INVENTION

The object of the present invention is to obviate this drawback. This is achieved with a method according to the invention, which is characterized in that the progress of the retrain procedure is monitored, and every time the procedure is stuck in its internal state (i.e. an initial state, or a state other than a data transmission state) for a period of time longer than a predetermined limit, the modem is commanded to initiate a start-up procedure known per se, by means of which the connection between the modems was originally established.

Instead of establishing a completely new connection to the other end every time the retrain procedure fails, it is the idea of the invention to attempt to establish only a new data connection without disconnecting the actual telephone connection if the retrain procedure indicates that the connection as such is in order.

The solution according to the invention allows the disconnection time to be considerably shortened. If the entire telephone connection is disconnected, the retrain procedure cannot proceed, wherefore the connection can be disconnected in a clearly shorter time than before, e.g. after 60 s. If the retrain procedure proceeds, it is obvious that the connection as such is in order but its quality is temporarily unsatisfactory, wherefore the connection is not disconnected but reestablishment of only the data transmission connection is attempted.

BRIEF DESCRIPTION OF THE DRAWINGS

In the following, the invention will be described in greater detail by way of example and with reference to FIG. 2 in the accompanying drawings, in which.

DETAILED DESCRIPTION

Figure 2:
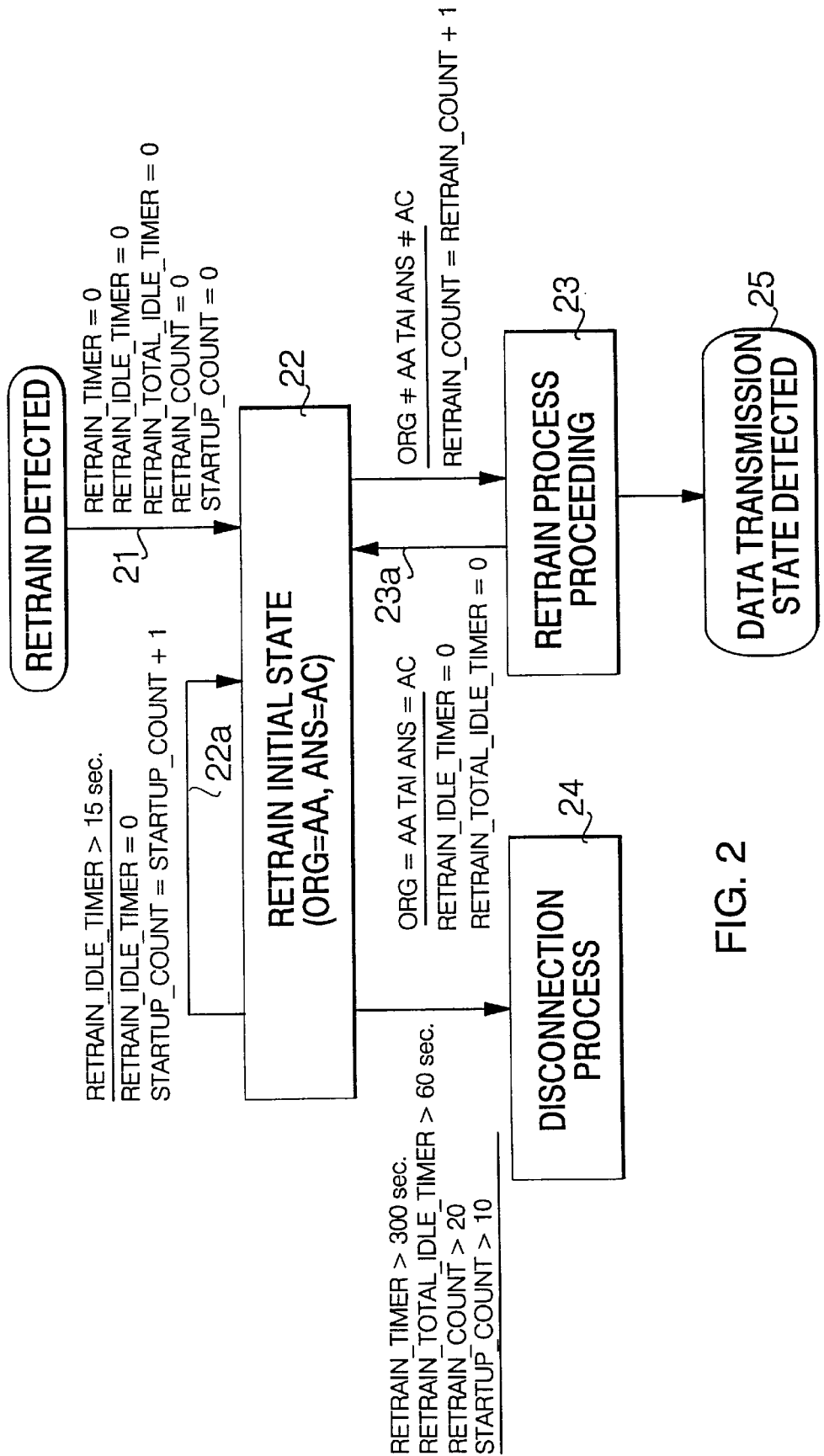
FIG. 2 is a state transition diagram illustrating the method according to the invention.

When the modems proceed to the retrain state after either of them has detected that the quality of the received signal is not satisfactory, the data connection is disconnected and the data received from the error corrector has no significance. In this case, the decision concerning disconnection of the connection must be made on the basis of data obtained from the data pump. The most reliable data on the state of the connection is obtained by monitoring the progress of the retrain procedure in detail. FIG. 2 illustrates more closely the principle of the monitoring process according to the invention.

If the retrain procedure does not proceed in the normal manner (and the modems are thus not able to return to the data transmission state), there are two alternative ways of proceeding:

1. The retrain procedure does not proceed at all.
2. The retrain procedure proceeds but not to the end; instead, it always returns to the initial state.

In the case of alternative 1, the modem does not hear the modem of the other end, wherefore no internal transitions in the retrain procedure take place (cf. CCITT (at present the ITU-T) recommendation V.32 bis). A reason for this may be that (a) the physical line (telephone connection) is disconnected, or (b) the data pump of the modem is somehow "stuck" in one state. The situation can be checked by commanding the modem to start the above-mentioned start-up procedure, by which the connection between the modems was originally established.

The following timers and counters are used for monitoring the retrain procedure:

RETRAIN_TIMER=a timer which measures the total time the modem has remained in the retrain state, RETRAIN_IDLE TIMER=a timer which measures the time the modem has remained in the initial state of the retrain procedure at a time (between the start-up procedures), RETRAIN_TOTAL_IDLE_TIMER=a timer which measures the total time the modem has remained in the initial state of the retrain procedure, RETRAIN_COUNT=a counter which counts the number of retrain attempts (an attempt when the retrain procedure proceeds from its initial state to another one of its internal states), START-UP_COUNT=a counter which counts the number of start-up procedures, i.e. the number of the attempts to re-establish the data connection of the entire physical connection.

When a transition to the retrain procedure is detected, all the above-mentioned timers and counters are reset (step 21, FIG. 2). In the initial state 22 of the retrain procedure, the calling modem (ORG) transmits the AA segment according to recommendation V.32 bis and the answering modem (ANS) transmits the AC segment. From the initial state it is possible to proceed only to two different states: either the retrain procedure starts to proceed, in which case it proceeds to state 23 (another internal state of the retrain procedure), or a process for disconnecting the connection is started and the procedure proceeds to the disconnection state 24.

If it is detected that the retrain procedure starts to proceed, the counter RETRAIN_COUNT is incremented by one. The detection may be based, for example, on the fact that the calling modem ORG stops transmitting the AA segment (ORG≠AA) or the answering modem ANS stops transmitting the AC segment (without that the state 24 for disconnecting the connection is proceeded to). If the retrain procedure proceeds in the normal manner, it proceeds thereafter to the data transmission state 25, whereby data transmission between the modems can be continued again. (In FIG. 2, the events that bring about each transition are indicated above the horizontal line beside each transition, whereas the events following the transition are indicated below the line.)

If the retrain procedure does not proceed to the end, the modem returns to the initial state 22 at some step of the retrain procedure. This can be detected, for example, when the calling modem (ORG) starts again to transmit the AA segment and the answering modem (ANS) the AC segment (ORG=AA or ANS=AC). In this case, the timers RETRAIN_IDLE_TIMER and RETRAIN_TOTAL_IDLE_TIMER are reset (step 23a).

If it is detected that the retrain procedure does not proceed from the initial state, the modem is commanded to start the start-up procedure again. This is effected by loading those sequences (commands) which denote a transition to the start-up procedure into the data pump of the modem. Such a "kick" is performed every time the RETRAIN_IDLE_TIMER has exceeded its limit, which may be e.g. 15 seconds as shown in FIG. 2. At the same time the counter START-UP_COUNT is incremented by one, and the RETRAIN_IDLE_TIMER is reset for new measurement. As the start-up and the retrain procedure are in practice identical for the most part (they contain identical synchronization parts, but the start-up procedure further includes listening to the answer tone, which starts the procedure, cf. the above-mentioned recommendation), the starting up of the start-up procedure is indicated in FIG. 2 with an arrow 22a returning to the retrain initial state 22.

If, however, the total time the modem has remained in the retrain state or in the retrain initial state 22 becomes too long or the number of above-mentioned "kicks" or retrain attempts becomes too high, the disconnection state 24 is proceeded to, i.e. the process for disconnecting the connection is started in a manner known per se (defined in the recommendations). The limits which start the transition to the disconnection state may be, for example, as follows:

RETRAIN_TIMER=300 seconds,
RETRAIN_TOTAL_IDLE_TIMER=60 seconds,
RETRAIN_COUNT=20,
START-UP_COUNT=10.

In principle, it should be possible to carry out the above-mentioned process in both the calling and the answering modem, as either one of them may be "stuck" in one state. However, depending on the practical realization, it may also be sufficient if the method according to the invention is implemented only in the answering modem.

Figure 1:
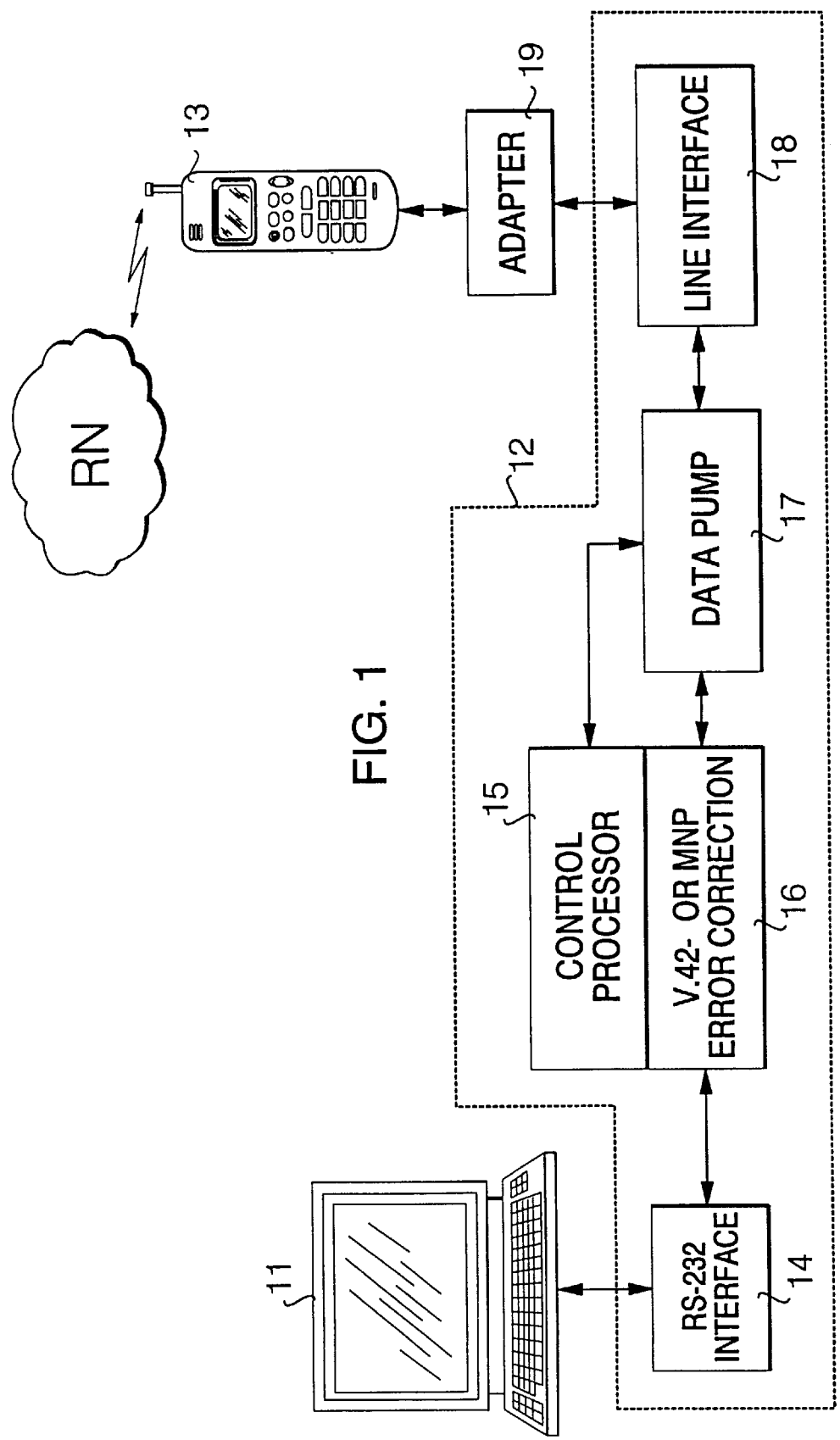
FIG. 1 is a block diagram of equipment for implementing a wireless modem connection.

The method according to the invention can be implemented quite easily in the equipment according to FIG. 1 by providing the equipment with the counters and timers described above. The other necessary modifications concern only the software of the modem.

Although the invention has been described above with reference to the examples illustrated in the accompanying drawings, it is obvious that the invention is not limited to the examples but can be modified within the scope of the inventive concept disclosed above and in the appended claims. For instance, although the invention is primarily intended for wireless transmission connections, the same principle can also be used for connections of a fixed telephone network. In addition, the modems to which the present method is applied do not necessarily have to be modems according to recommendation V.32 bis, but it is also possible to use modems according to other compatible, previous and future recommendations. In addition to the initial state of the retrain procedure, it is also possible to monitor other internal states of the retrain procedure, and perform a "kick" according to the invention if a modem is "stuck" in these states.

APPENDIX

The following is an extract from pages 14–16 of ITU-T Recommendation v.32 bis which describes the start-up procedure of a v.32 bis connection between modems, and the retrain procedure, which are referred to in the body of the specification of this document.

6. Start-up procedure

The procedure for achieving synchronism between the calling modem and the answering modem on international GSTN connections is shown in FIG. 3/V.32 bis. The procedure includes the estimating of round-trip delay from each modem, the training of echo cancellers and receivers initially with half-duplex transmissions, and the exchanging of rate signals for automatic bit-rate and mode selection.

6.1 Call mode modem

After receiving the answer tone for a period of at least 1 s as specified in Recommendation V.25, the modem shall be connected to line (see Note 1 below) and shall condition the scrambler and descrambler in accordance with § 4.1.

The modem shall repetitively transmit carrier state A as shown in FIG. 2–5/V.32 bis.

The modem shall be conditioned to detect (see Note 2 below) one of two incoming tones at frequencies 600±7 Hz and 3000±Hz, and subsequently to detect a phase reversal in that tone.

On detection of one such phase reversal, the modem shall be conditioned to detect a second phase reversal in the same tone, start a counter/timer and change to repetitively transmitting state C as shown in FIG. 2–5/V.32 bis. The time delay between the reception of this phase reversal at the line terminals and the transmitted AA to CC transition appearing at the line terminals shall be 64±2 symbol periods.

On detection of a second phase reversal in the same incoming tone, the modem shall stop the counter/timer and cease transmitting.

When the modem detects an incoming S sequence (see § 5.2), it shall proceed to train its receiver, and then seek to detect at least two consecutive identical 16-bit rate sequences as defined in Table 5/V.32 bis.

On detection of the rate signal (R1), the modem shall transmit an S sequence for a period NT already estimated by the counter/timer.

After this period has expired (see Note 3 below), the modem shall transmit the receiver conditioning signal as defined in § 5.2, starting with an S sequence for 256 symbol intervals.

Transmission of the TRN segment of the receiver conditioning signal may be extended in order to ensure a satisfactory level of echo cancellation (see Note 4 below).

After the TRN segment, the modem shall apply ON condition to circuit 107 and transmit a rate signal (R2) in accordance with § 5.3 to indicate the currently available data rates. R2 shall exclude rates not appearing in the previously received rate signal R1. It is recommended that R2 take also account of the likely receiver performance with the particular GSTN connection. It appears that satisfactory performance cannot be attained at any of the available data rates, then R2 should be used to call for a GSTN cleardown in accordance with Table 5/V.32 bis.

Transmission of R2 shall continue until an incoming rate signal R3 is detected. The modem shall then, after completing its current 16-bit rate sequence, transmit a single 16-bit sequence E in accordance with § 5.3.2 indicating the data rate called for in R3. If, however, R3 is calling for GSTN cleardown in accordance with Table 5/V.32 bis, then the call modem shall disconnect from time and effect a cleardown.

The modem shall then transmit continuous scrambled binary ones at the data rate called for in R3. If trellis coding is to be used, the initial states of the delay elements of the convolution encoder shown in FIG.1/V.32 bis shall be set to zero.

On detecting an incoming 16-bit E sequence as defined in § 5.3.2, the modem shall condition itself to receive data at the rate indicated by the incoming E sequence. After a delay of 128 symbol intervals, it shall apply an ON condition to circuit 109, and unclamp circuit 104.

The modem shall then enable circuit 106 to respond to the condition of circuit 105 and be ready to transmit data.

6.2 Answer mode modem

On connection to line, the modem shall condition the scrambler and descrambler in accordance with § 4.1, and transmit the Recommendation V.25 answer sequence. Means, defined in Recommendation V.25 of disabling network cancellers and/or truncating the answer tone may be employed.

After the Recommendation V.25 answer sequence, the modem shall transmit alternate carrier states A and C as shown in FIG. 2–5/V.32 bis.

After alternate states A and C have been transmitted for an even number of symbol intervals greater than or equal to 128 and an incoming tone has been detected at 1800±7 Hz for 64 symbol periods (see Note 5 below), the modem shall be conditioned to detect a phase reversal in the incoming tone, start a counter/timer, and change to transmitting alternate carrier states C and A for an even number of symbol intervals.

On detecting a phase reversal in the incoming tone, the modem shall stop the counter/timer and, after transmitting a state A, revert to transmitting alternate states A and C. The time delay between the reception of this phase reversal at the line terminals and the transmitted CA to AC transition appearing at the line terminals shall be 64±2 symbol periods.

When an amplitude drop is detected in the incoming tone, the modem shall cease transmitting for a period of 16 symbol intervals and then (see Note 3 below) transmit the receiver conditioning signal as defined in § 5.2.

Transmission of the TRN segment of the receiver conditioning signal may be extended in order to ensure a satisfactory level of echo cancellation (see Note 4 below).

After the TRN segment, the modem shall transmit a rate signal (R1) in accordance with §5.3 to indicate the data rates currently available in the answer modem and associated DTE.

On detection of an incoming S sequence, the modem shall cease transmitting.

The modem shall wait for a period MT already estimated by the counter/timer and then, if an incoming S sequence persists, or when an S sequence reappears (see Note 3 below), the modem shall proceed to train its receiver.

After training its receiver, the modem shall seek to detect at least two consecutive identical incoming 16-bit rate sequences as defined in § 5.3.

On detection of a rate signal (R2), the modem shall apply ON condition to circuit 107 and transmit a second receiver conditioning signal as defined in § 5.2.

After the TRN segment, the modem shall transmit a second rate signal (R3) in order to indicate the data rate to be used by both modems. The data rate selected by R3 shall be within those indicated by R2. It is recommended that R3 take also account of the likely performance of the answer modem receiver with the particular GSTN connection established. If R2 is calling for a GSTN cleardown (see Table 5/V.32 bis) and/or if it appears that satisfactory performance cannot be attained by the answer modem at any of the available data rates, then R3 should call for a GSTN cleardown, in accordance with Table 5/V.32 bis (see Note 6 below).

When the modem detects an incoming 16-bit E sequence as defined in § 5.3.2, it shall condition itself to receive data at the rate indicated by the E sequence.

The modem shall complete the current 16-bit rate sequence and then transmit a single 16-bit E sequence indicating the data rate to be used in the subsequent transmission of scrambled binary ones. If trellis coding is to be used, then the initial states of the delay elements of the convolution encoder shown in FIG. 1/V.32 bis shall be set to zero.

The modem shall transmit scrambled binary ones for 128 symbol intervals, then enable circuit 106 to respond to the condition of circuit 105 and be ready to transmit data.

The modem shall also apply ON condition to circuit 109 and unclamp circuit 104.

Notes to § 6

Note 1—Once an incoming tone is detected at 600±7 Hz or 3000±7 Hz, the calling modem may proceed with the start-up sequence even if no 2100 Hz tone has been detected.

Note 2—In some cases, the incoming tones may be preceded by a special pattern which may last up to 3100 ms.

Note 3—The TRN segment in the receiver conditioning signal is suitable for training the echo canceller in the transmitting modem. Alternatively, it is acceptable to proceed the receiver conditioning signal by A sequence which can be used specially for training the echo canceller, but which need not be defined in detail in the Recommendation. The echo cancellation sequence (if used) must maintain energy transmitted to line to hold network echo control devices disabled (as required). In order to avoid confusion with Segments 1 or 2 of the receiver conditioning signal defined in § 5.2, the echo cancellation sequence shall produce a transmitted signal such that the sum of its power in the three 200 Hz bands centered at 600 Hz, 1800 Hz and 3000 Hz is at least 1 dB less than its power in the remaining bandwidth. This applies for the relative power averaged over any 6 ms time interval. The duration of this signal must not exceed 8192 symbol intervals.

Note 4—Manufactures are cautioned that a period of 650 ms is needed for training any network echo cancellers conforming to Recommendation G.165, that may be encountered on GSTN connections.

Note 5—The answering modem may disconnect from the line if the 1800±7 Hz tone is not detected following transmission of the segment AC. However, to assure compatibility with manual originating data stations, it shall not disconnect for at least 3 seconds after the segment AC has been transmitted.

Note 6—If R3 is calling for a GSTN cleardown, the modem shall repeat the transmission of signal R3 for not less than 64 symbol intervals before clearing the connection.

7. Retrain procedure

A retrain may be initiated during data transmission if either modem incorporates a means of detecting unsatisfactory signal reception FIG. 4a)/V.32 bis shows a retrain event initiated by the calling modem and FIG. 4b)/V.32 bis shows a retrain event initiated by the answering modem. The procedure is as follows:

7.1 Call mode modem

Following detection of unsatisfactory signal reception or detection of one of two tones at frequencies 600±7 Hz and 3000±7 Hz for more than 128 symbol intervals, the modem shall turn OFF circuit 106 clamp circuit 104 to binary one and repetitively transmit carrier state A as shown in FIG. 2–5/V.32 bis. It shall then proceed in accordance with § 6.1 beginning with the third paragraph.

7.2 Answer mode modem

Following decision of unsatisfactory signal reception or detection of a tone of frequency 1800±7 Hz for more than 128 symbol intervals the modem shall turn OFF circuit 106, clamp circuit 104 to binary one and transmit alternate carrier states A and C for an even number of symbol intervals not less than 128. It shall then proceed in accordance with § 6.2 beginning with the third paragraph.

7.3 Operation of circuits 107 and 109 during retrain procedure

Circuit 107 shall be maintained in the ON condition during the retrain procedure.

Circuit 109 shall be maintained in the ON condition except that the OFF condition may optionally be applied if transmission of the AA segment in the call modem or the first AC segments in the answer modem continues for a period exceeding 45 seconds. If the retrain procedure is subsequently completed, the ON condition shall be re-applied to circuit 109 at the time that circuit 104 is unclamped.

I claim:

1. A method for controlling a wireless connection between two modems in the event of disturbance, comprising:

initiating a retrain procedure in the event of disturbance of a connection between the modems when either one of the modems receives a signal of unsatisfactory quality, in which retrain procedure the modems transmit predetermined retrain signals to each other in order to achieve synchronism between them monitoring progress of the retrain procedure, and every time the procedure is stuck in a state other than a data transmission state for a period of time longer than a predetermined limit, commanding the respective modem to initiate a repetition of a start-up procedure by means of which the connection between the modems was originally established.

2. The method according to claim 1, wherein:

in practicing said commanding, if the number of commanded start-up procedures exceeds a predetermined limit, entirely disconnecting the connection between the modems.

3. The method according to claim 1, wherein:

in practicing said commanding, if the total time the procedure remains in a state other than a data transmission state exceeds a predetermined limit, entirely disconnecting the connection between the modems.

4. The method according to claim 1, wherein:

said monitoring progress of the retrain procedure includes controlling an initial state of the retrain procedure, which is a state other than a data transmission state.

* * * * *